(12) United States Patent
Lawson et al.

(10) Patent No.: US 7,231,378 B2
(45) Date of Patent: Jun. 12, 2007

(54) SYSTEM AND METHOD FOR MANAGING USER PROFILES

(75) Inventors: Robert James Lawson, Cincinnati, OH (US); Mark Creekmore, Jr., Lebanon, OH (US); Subroto Kumar Basu, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 440 days.

(21) Appl. No.: 09/842,577

(22) Filed: Apr. 26, 2001

(65) Prior Publication Data

US 2002/0161766 A1     Oct. 31, 2002

(51) Int. Cl.
    *G06F 17/30*     (2006.01)
(52) U.S. Cl. ............... 707/2; 707/9; 707/10; 709/203; 709/217; 709/232
(58) Field of Classification Search ............. 707/2, 707/9, 10; 709/203, 217, 232
    See application file for complete search history.

(56) References Cited

U.S. PATENT DOCUMENTS

| | | | |
|---|---|---|---|
| 5,950,195 A * | 9/1999 | Stockwell et al. ............ 707/4 |
| 6,195,698 B1 * | 2/2001 | Lillibridge et al. ......... 709/205 |
| 6,202,062 B1 | 3/2001 | Cameron et al. | |
| 6,202,207 B1 | 3/2001 | Donohue | |
| 6,236,972 B1 | 5/2001 | Shkedy | |
| 6,253,326 B1 | 6/2001 | Lincke et al. | |
| 6,513,039 B1 * | 1/2003 | Kraenzel .................... 707/9 |
| 6,535,879 B1 * | 3/2003 | Behera ....................... 707/9 |

OTHER PUBLICATIONS

Administrative Information Services, Oracle HR, CERN, pp. 1-3, <http://ais.cern.ch/apps/hr/welcome.html>.*

* cited by examiner

*Primary Examiner*—Hung Pham
(74) *Attorney, Agent, or Firm*—William Scott Andes Armstrong Teasdale LLP

(57) ABSTRACT

A system and a method for managing user and data profiles utilizing a web-enabled interactive database to organize, store and retrieve the information to create a consistent security model through centralized administration, are disclosed. The system captures various rules and pre-determined methodologies to provide on-line, up-to-date decisions to the users when users request access to a set of specific data or an application. The system further provides the capability to the user to request access to information that the user currently does not have access to, tracks the status of the request, obtains approval/disapproval decision from the data owner, implements the decision, and notifies requester within a reasonable time.

4 Claims, 10 Drawing Sheets

SYSTEM AND METHOD FOR MANAGING USER PROFILES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to management of user profiles, and more particularly, to network-based systems and methods for creating consistent security model with centralized administration.

The Internet is used extensively in managing day-to-day business, and is also a source and method of communication with customers. More specifically, the Internet provides corporations with a tool for disseminating products, services, and information to customers in a timely fashion to meet aggressive revenue and profitability targets.

Currently, multiple applications, often developed in different application development environments, have proprietary user directories that provide access control into each application using built-in security models. As a result, users access each application separately through different security access controls. More specifically, as a result the current system includes redundant development efforts, and may actually provide inconsistent security between different applications, thus, increasing a difficulty of reliable and secure management of the applications. As a result, management of the applications in the complex system may be a costly process.

BRIEF SUMMARY OF THE INVENTION

In an exemplary embodiment, a Users Profile Management System (UPMS) creates an application that facilitates managing user profile information in a cost-effective and reliable manner. Furthermore, the UPMS facilitates simplifying access control to the applications and data for the growing web-based systems by providing the same level of security across the different applications.

The UPMS is used with web-based and non-web-based applications, and provides access control to the data based on pre-loaded user profiles. More specifically, the UPMS permits corporate user security levels to be defined independently. Furthermore, the UPMS integrates with Lightweight Directory Access Protocol (LDAP), and provides development specification for interfaces.

The UPMS also facilitates administration of a common security model for access control and event notification. Profiles are automatically updated on a weekly basis within the UPMS when there is a change in an organization hierarchy, or when a person transfers departments.

In one embodiment, the UPMS includes a web-enabled interactive database that manages users on-line. More specifically, user relevant information is captured by the UPMS, such that on-line, up-to-date information is available upon request. The user's relevant information is monitored from inception to completion, such that a status may be provided to a system manager regarding the user's access levels in response to the management's inquiries. In the exemplary embodiment, the system utilizes a Relational Database including a client user interface front-end for administration use, and a web interface for standard user input and reports.

In yet another embodiment of the database, the invention is a database that is protected from access by unauthorized individuals using user and data profiles managed by an administrator. More specifically, access to the database is based on pre-determined rules and criteria. The database stores, retrieves, and updates various data, including, but not limited to at least one of Rule Based Access guidelines, Group Based Access guidelines, Search & Subscribe Utilities guidelines, Active Positioning Monitoring guidelines, Hard Exclusion Rules guidelines, and Access Audits guidelines. Additionally, the database stores, retrieve, and updates data corresponding to applications, such that application data is cross-referenced against unique identifiers.

In a further embodiment, the UPMS is a system for managing user and data profiles through the utilization of a web-enabled interactive database that organizes, stores and retrieves information to create a consistent security model through centralized administration. The system captures various rules and predetermined methodologies to provide on-line, up-to-date decisions to users when a user requests access to a set of specific data or an application. The system further provides the user the capability to request access to information that the user currently does not have access to. The system then tracks the status of the request, obtains an approval/disapproval decision from the data owner, implements the decision, and notifies the requester within a reasonable time. The UPMS supports various levels of management hierarchy and provides access to individuals based on a position held by the individual within the business entity.

In another embodiment of the invention, the UPMS utilizes a method for organizing user and data profiles using a web-based system that includes a server system coupled to a centralized interactive database, and at least one client system. The method includes the steps of creating an electronic profile for a user within a centralized database, creating an electronic profile for data within the centralized database, and establishing pre-determined rules and methodology for user access.

DETAILED DESCRIPTION OF THE INVENTION

Figure 1:
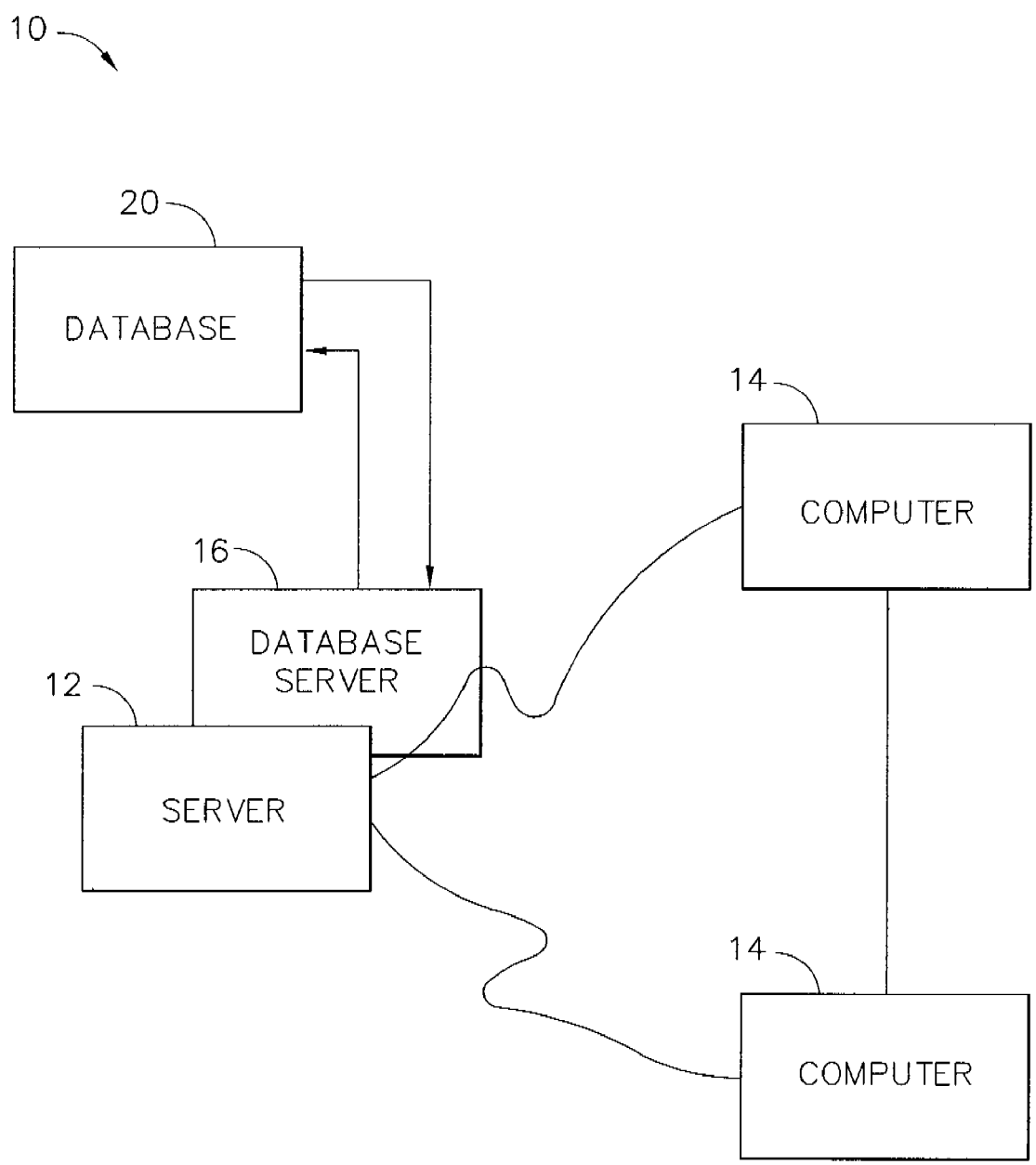
FIG. 1 is a simplified block diagram of a Users Profile Management System (UPMS) in accordance with one embodiment of the present invention.

FIG. 1 is a simplified block diagram of a Users Profile Management System (UPMS) 10 including a server system 12 and a plurality of client systems 14 connected to server system 12. UPMS 10 provides a system and a methodology used to define users that have similar needs and interests.

UPMS 10 also provides an application to manage user profile information including access control to applications, and data for the growing web-based systems. More specifically, UPMS 10 streamlines the process by utilizing the same level of security across the different applications, thus facilitating a consistent security model including centralized security administration.

UPMS 10 is used with web-based and non-web-based Corporate Applications. UPMS 10 integrates with Lightweight Directory Access Protocol (LDAP) and provides development specification for interfaces, such that access control to data is provided using user profiles. As a result, all corporate user IDs may be defined with access permission levels. Furthermore, UPMS 10 provides a common security model for access control and event notification. UPMS 10 also updates user profiles automatically on a pre-determined timed interval, when a change in an organization hierarchy is detected, or when a person is transferred to a different department. System 10 then generates a report detailing which users have access to data, and what data exists that is not accessible by anyone.

In one embodiment, client systems 14 are computers that include a web browser, such that server system 12 is accessible to client systems 14 via the Internet. Client systems 14 are interconnected to the Internet through many interfaces including, but not limited to a network, such as a local area network (LAN) or a wide area network (WAN), dial-in-connections, cable modems and special high-speed ISDN lines. Client systems 14 could be any device capable of interconnecting to the Internet including a web-based phone or other web-based connectable equipment. A database server 16 is connected to a centralized database 20 that includes product related information on a variety of products, as described below in greater detail. In one embodiment, centralized database 20 is stored on database server 16 and is accessed by potential users at one of client systems 14 by logging onto server system 12 through one of client systems 14. In an alternative embodiment centralized database 20 is stored remotely from server system 12.

UPMS 10 utilizes a web-enabled interactive database that automates an information and management process. System 10 captures community-related information and provides on-line, up-to-date information upon request. In one exemplary embodiment, system 10 utilizes a Relational Database with a client user interface front-end for administration and a web interface for standard user input and reports. Information is accessible from the database through Structured Query Language (SQL). Accordingly UPMS 10 is an information and management tool that may facilitate building stronger relationships with the customer base.

Figure 2:
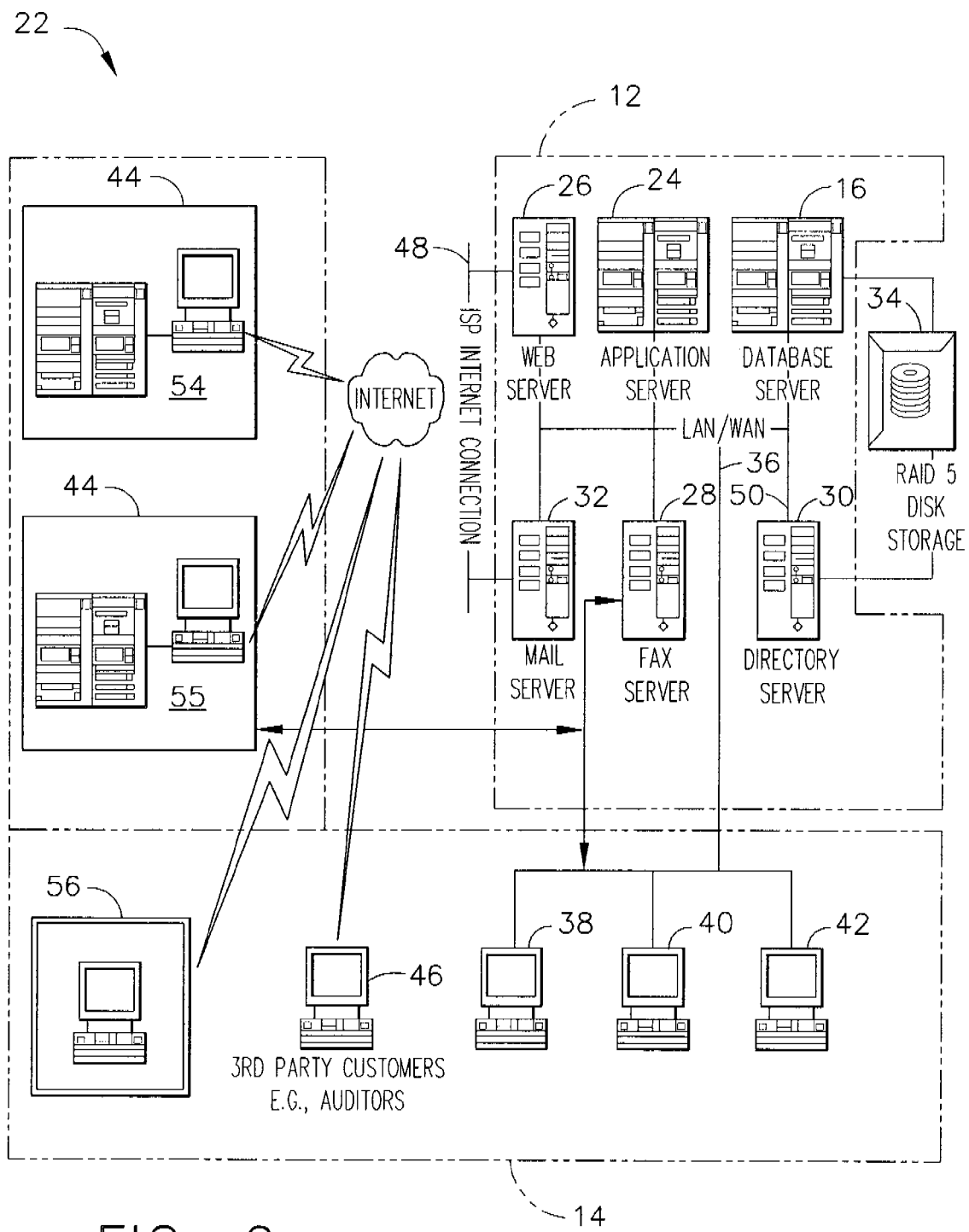
FIG. 2 is an expanded version block diagram of an exemplary embodiment of a server architecture of the UPMS.

FIG. 2 is an expanded version block diagram of an exemplary embodiment of a server architecture of a UPMS 22. UPMS 22 is utilized when the number of users is numerous, such that a more powerful system architecture is demanded. Components in system 22, identical to components of system 10 (shown in FIG. 1), are identified in FIG. 2 using the same reference numerals used in FIG. 1. System 22 includes server system 12 and client systems 14. Server system 12 also includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 via an Internet link or are connected through an intranet.

Each workstation, 38, 40, and 42 is a personal computer including a web browser. Although the functions performed at each workstation are illustrated as being performed at respective workstations 38, 40, and 42, such functions may be performed at one of many personal computers coupled to LAN 36. Workstations 38, 40, and 42 are illustrated as being associated with separate functions only to facilitate an understanding of the different types of functions that can be performed by individuals having access to LAN 36.

In another embodiment, server system 12 is configured to be communicatively coupled to various individuals or employees 44 and to third parties, 46, e.g., internal or external auditors, via an ISP Internet connection 48. The communication in the exemplary embodiment is illustrated as being performed via the Internet, however, any other wide area network (WAN) type communication may be utilized in other embodiments, i.e., the systems and processes are not limited to being practiced via the Internet. In addition, and rather than WAN 50, local area network 36 could be used in place of WAN 50.

In the exemplary embodiment, any authorized individual or an employee of the corporation having a workstation 54 can access UPMS 22. At least one client system includes a senior manager's workstation 55 located at a remote location. Workstations 54 and 55 are personal computers having a web browser, and configured to communicate with server system 12. Furthermore, fax server 28 communicates with employees located outside the business entity's 44 and any of the remotely located client systems, including a client system 56 via a telephone link. Fax server 28 is configured to communicate with other client systems 38, 40, and 42 as well.

Figure 3:
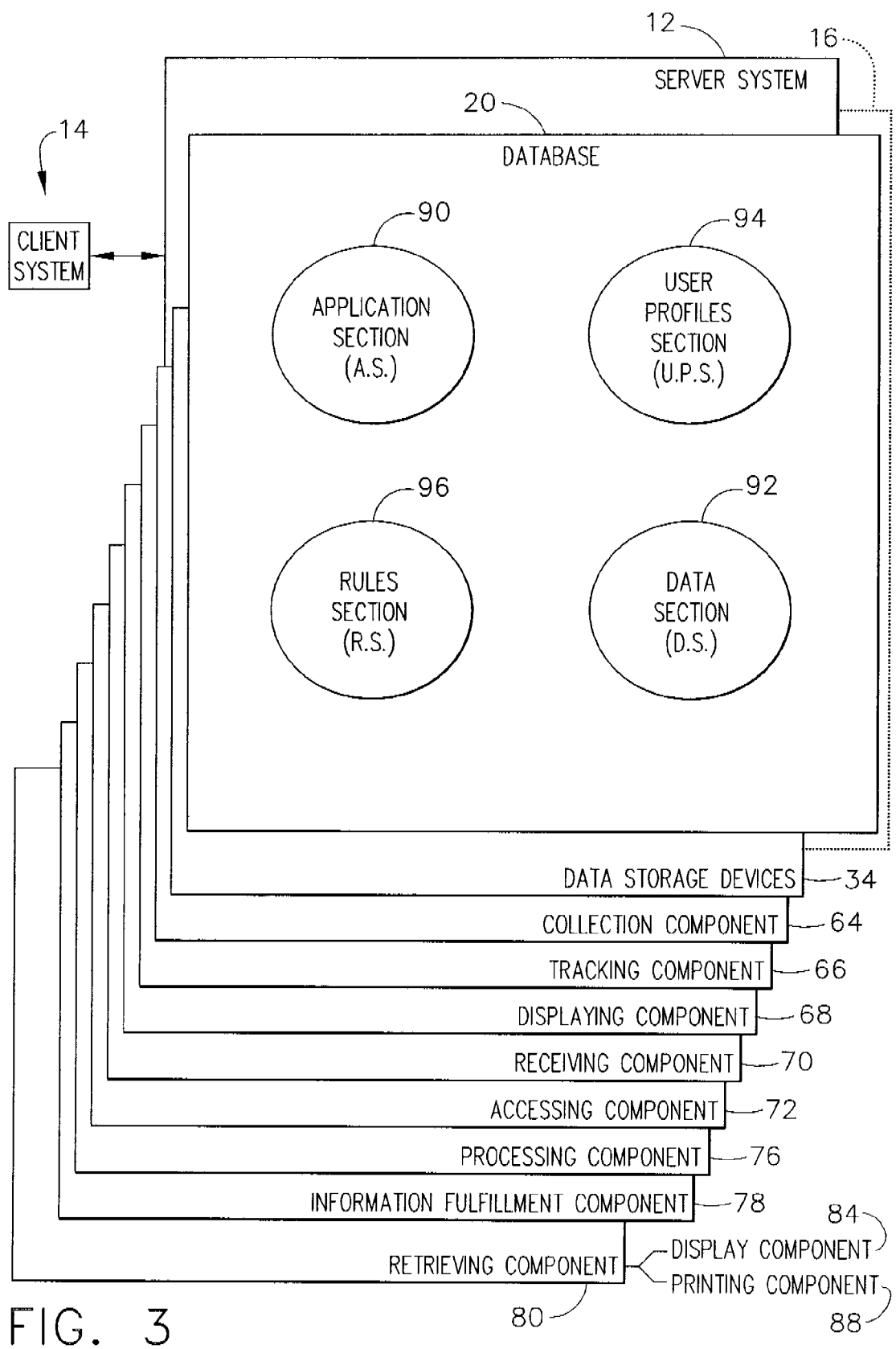
FIG. 3 shows a configuration of a database within the database server of the server system with other related server components.

FIG. 3 shows a configuration of database 20 within database server 16 of server system 12 shown in FIG. 1. Database 20 is coupled to several separate components within server system 12, which perform specific tasks. Server system 12 includes a collection component 64 for collecting information from users into centralized database 20, a tracking component 66 for tracking information, a displaying component 68 for displaying information, a receiving component 70 for receiving queries from client system 14, and an accessing component 72 for accessing centralized database 20. Receiving component 70 is programmed to receive a specific query from one of a plurality of users. Server system 12 also includes a processing component 76 for searching and processing received queries within data storage device 34 for information collected by collection component 64. An information fulfillment component 78, located in server system 12, downloads requested information to the users in the order in which the data requests were received by receiving component 70. More specifically, information fulfillment component 78 downloads the information after the information is retrieved from data storage device 34 by a retrieving component 80. Retrieving component 80 retrieves, downloads and sends information to client system 14 based on a query received from client system 14 regarding various alternatives.

Retrieving component 80 also includes a display component 84 for downloading information to be displayed on a client system's graphical user interface, and a printing component 88 for printing information. Although, retrieving component 80 generates various reports requested by the user through client system 14 in a pre-determined format, system 10 is flexible an permits a user to select alternative report formats, and thus, the user is not constrained to the options set forth above.

Database 20 is divided into an Application Section 90, a Data Section 92, a Users Profiles Section 94, and a Rules Section 96. Sections 90, 92, 94, and 96 are interconnected within database 20, such that data and information may be updated and retrieved from Sections 90, 92, 94, and 96 as required. Each Section 90, 92, 94, and 96 is also divided into several individualized sub-sections that store data in various different categories. The architecture of system 10, as well as various components of system 10, are exemplary only, and other architectures are possible and may be utilized in connection with practicing the processes described below.

Figure 4:
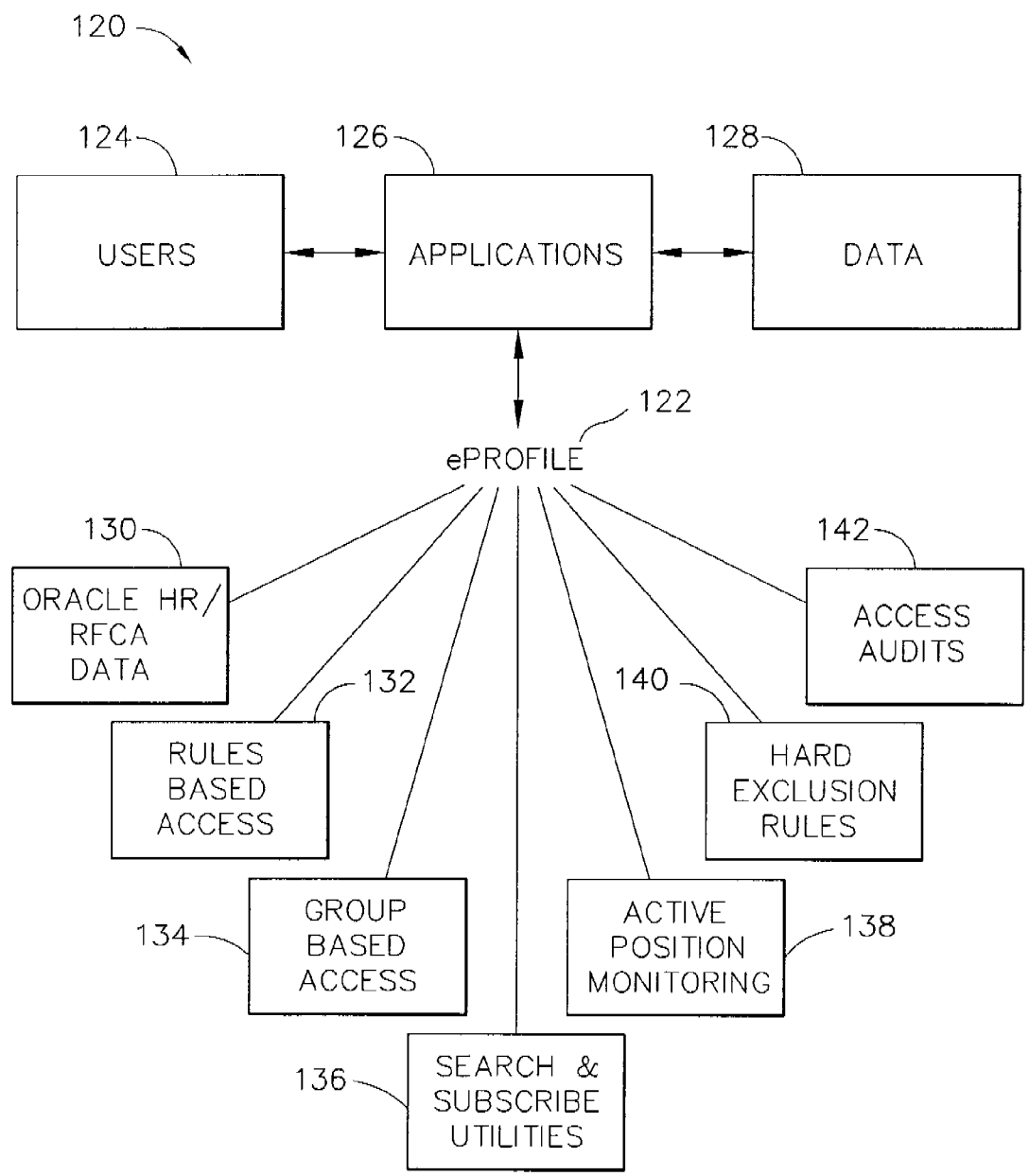
FIG. 4 is an exemplary embodiment of a process flow describing the basic functionality of the UPMS.

FIG. 4 is an exemplary embodiment of a process flow 120 describing the basic functionality of the UPMS. UPMS 10 creates electronic profiles of the user known as "eProfiles" 122. More specifically, users 124 defined by UPMS 10 include current and future end users 124 including, but not limited to, employees, suppliers, customers and contractors who can access the corporation network and as well as existing different applications. The applications cover many hierarchies in the department, and users 124 access UPMS 10 through login sessions that require a user id and a user password.

When users 124 log into various Applications 126 to access Applications 126, as well as associated Data 128, UPMS 10 reviews each eProfile 122 prior to providing access to applications 126 or data 128. The eProfile database is programmed using information retrievable from an Oracle Human Resource (OHR) Application, as well as a Request For Computer Access (RFCA) Application 130. More specifically, user profiles developed in OHR and RFCA is stored in eProfile 122. Users 124 are given access to Applications 126 and Data 128 based on pre-established criteria that are developed from various rules and access criteria established by the management. Some of these include: Rules Based Access 132, Group Based Access 134, Search & Subscribe Utilities 136, Active Positioning Monitoring 138, Hard Exclusion Rules 140, and Access Audit 142 guidelines.

Figure 5:
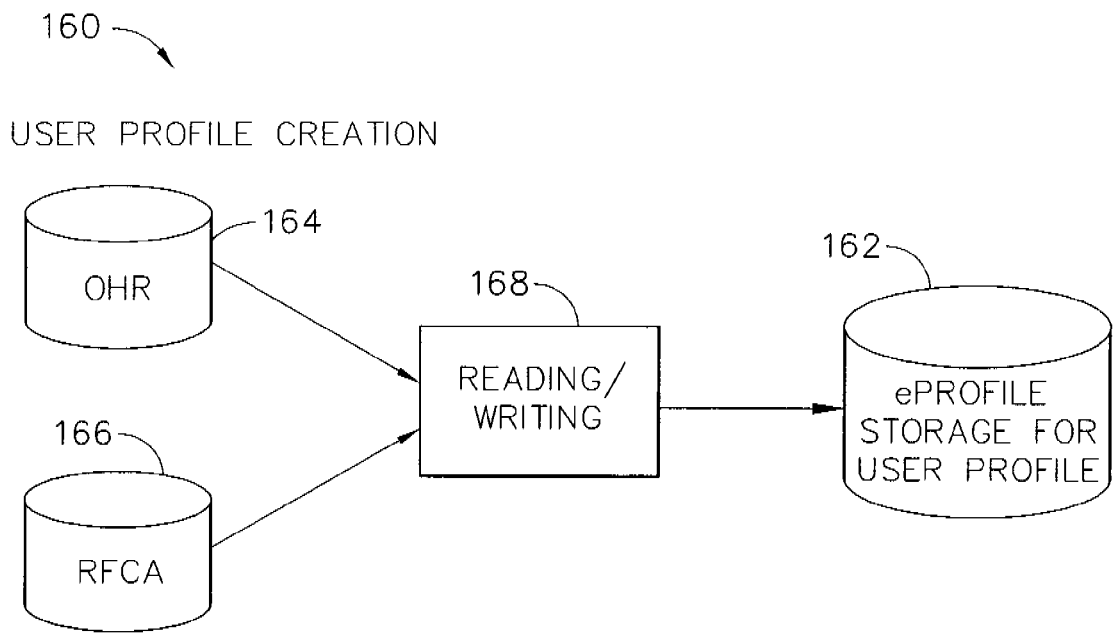
FIG. 5 is an exemplary embodiment of a process flow for creating user profile within the database.

FIG. 5 is an exemplary embodiment of a process flow 160 for creating user profiles within database 20. An eProfile database 162 is programmed using information available from an Oracle Human Resource (OHR) Application 164, as well as a Request For Computer Access (RFCA) Application 166. An initial user profile developed through OHR 164 and RFCA 166 is stored in eProfile database 162, and eProfile database 162 stores user profiles within a subsection of database 20. Any restrictions 168 on the user profile, such as reading or writing rights, are also stored in eProfile database 162. The users are provided access based on these restrictions.

User profiles within eProfile database 162 are created using a reliable source that identifies each user's organization and citizenship for export control. In one embodiment, eProfile database 162 includes foreign national contractors and customers also for exception list. In addition, eProfile database 162 is updated on a pre-determined timed interval, when there are changes in organizational hierarchy, when a person transfers to another organization, or when a person leaves the company.

Figure 6:
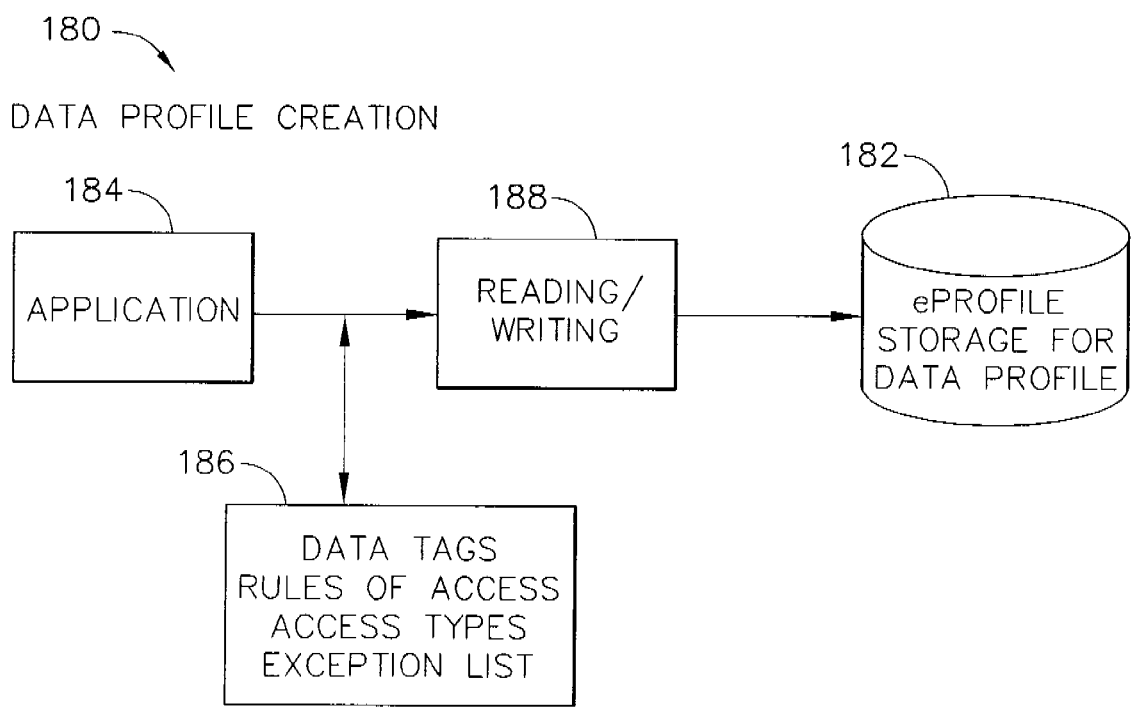
FIG. 6 is an exemplary embodiment of a process flow for creating data profile within the database.

FIG. 6 is an exemplary embodiment of a process flow 180 for creating data profile within database 20. Data profiles 182 created within eProfile database 162 (shown in FIG. 5) are built using information available from various sources. For each application 184, a system administrator defines various attributes 186 of the application, including but not limited to data elements, data tags, Rules of Access, An Approver's Name for Each Rule, Rules of Exclusion, Exception Lists, and Field Tags (e.g. Read, Write, Notify). Each data profile 182 developed is stored in eProfile database 162, which stores data profiles 182 in a sub-section of database 20. Any restrictions 188 on the data profile, such as reading or writing rights, are also stored within eProfile database 162, and users are provided access based on these restrictions.

Figure 7:
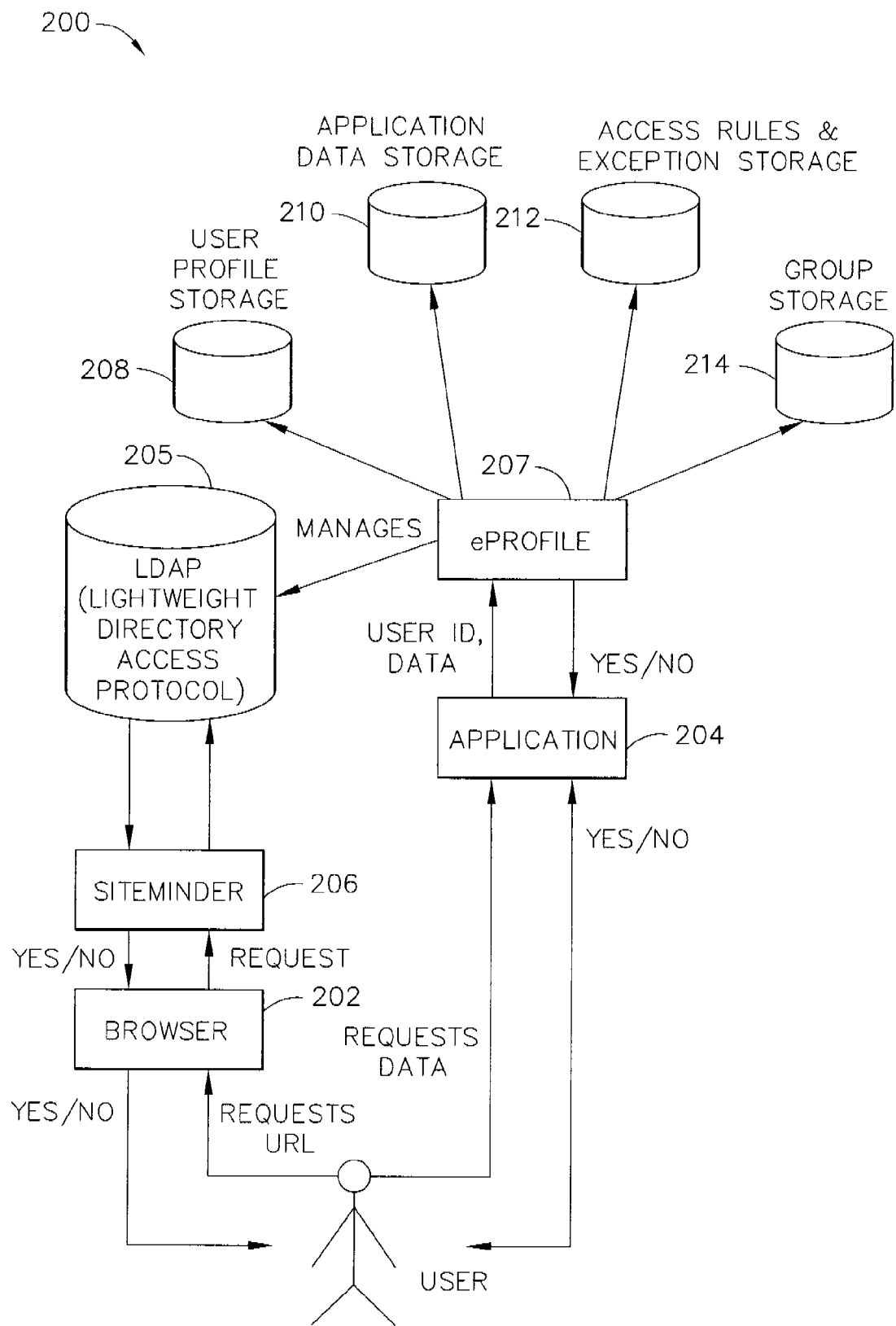
FIG. 7 describes a User Access Process.

FIG. 7 describes a user access process 200. User access process 200 includes requesting access to a Uniform Resource Locator (URL) by utilizing a browser 202 or requesting an access to an Application 204. Each request for a URL is processed by a Lightweight Directory Access Protocol (LDAP) 205 through a SiteMinder 206 which evaluates each request. If approved, the requested URL is then downloaded by server system 12 (shown in FIG. 1). If the request is denied based on access rules, a message is sent informing the user that the access is denied.

User access process 200 includes requesting access to Application 204. The request is processed by eProfile database server 207 after the user's id and password are authenticated. Database server 207 retrieves information from one of a User Profile Storage 208, an Application Data Storage 210, Access Rules & Exception Storage 212, and a Group Storage 214 or LDAP 205, and based on the information retrieved, and the rules stored under Access Rules & Exception Storage 212, system 10 either downloads application 204 or denies access of application 204.

Figure 8:
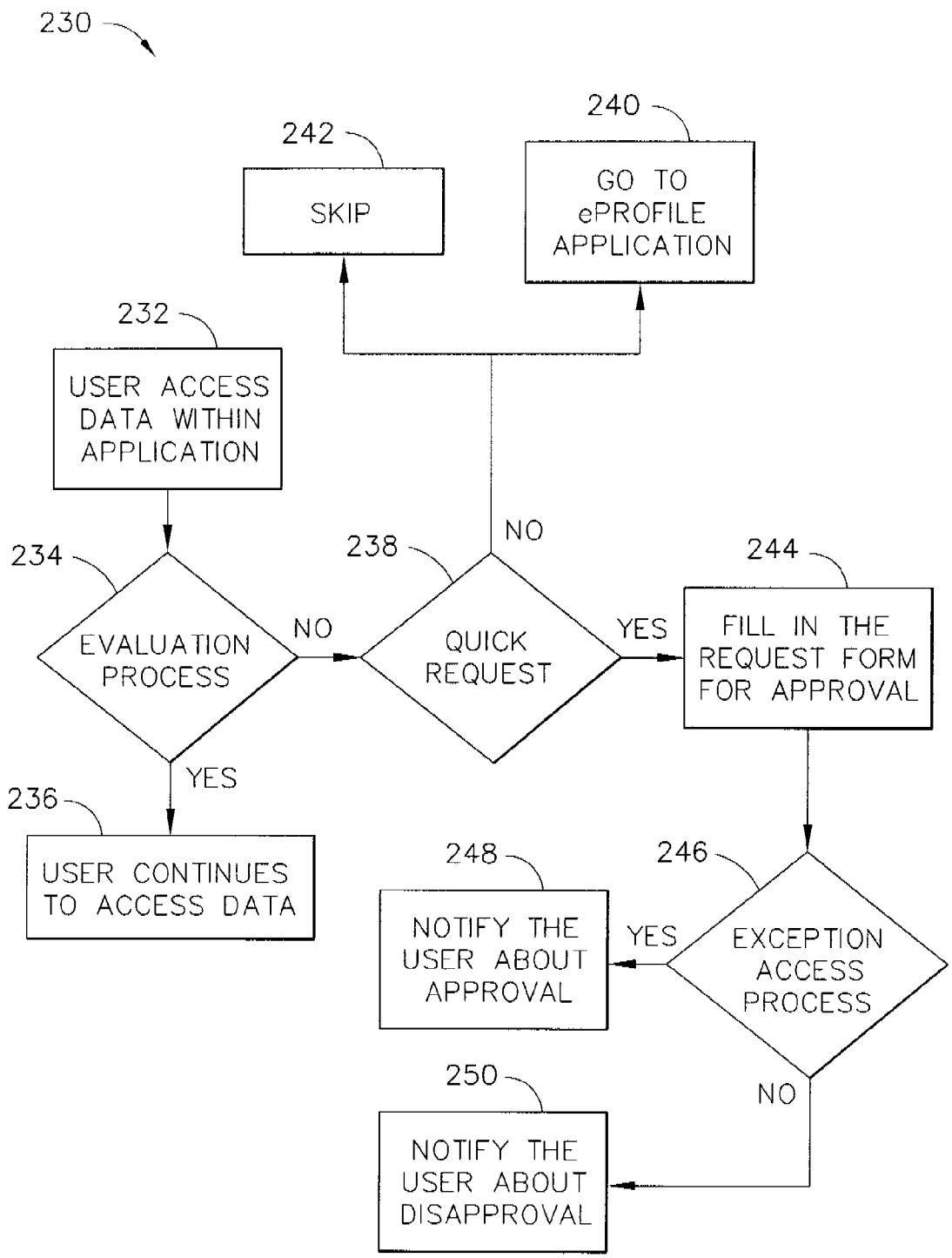
FIG. 8 is an exemplary embodiment of a flow chart describing the Default Access Process.

FIG. 8 is an exemplary embodiment of a flow chart describing Default Access Process 230. Default Access Process 230 relates to the system's decision making process to permit the user access to a set of specific data within the application. Once the user accesses data within the application 232, UPMS 10 invokes an evaluation process 234 to determine whether the user is permitted to access the requested data. If the user has permission to access, the user continues with the application to access the data 236. If the user is denied access, a decision for quick request 238 is explored by the system. If the user desires not to pursue quick request 238, the user is directed to eProfile application 240 or the user can skip 242 the entire process by exiting from the application. If the user decided to pursue quick request 238, user completes a request for approval 244 which is subjected to an internal exception access process 246. If the user is approved based on pre-established criteria, the user is notified of the approval 248. Alternatively, if the user is denied access, a notification informing of the denial 250 is sent to the user.

Figure 9:
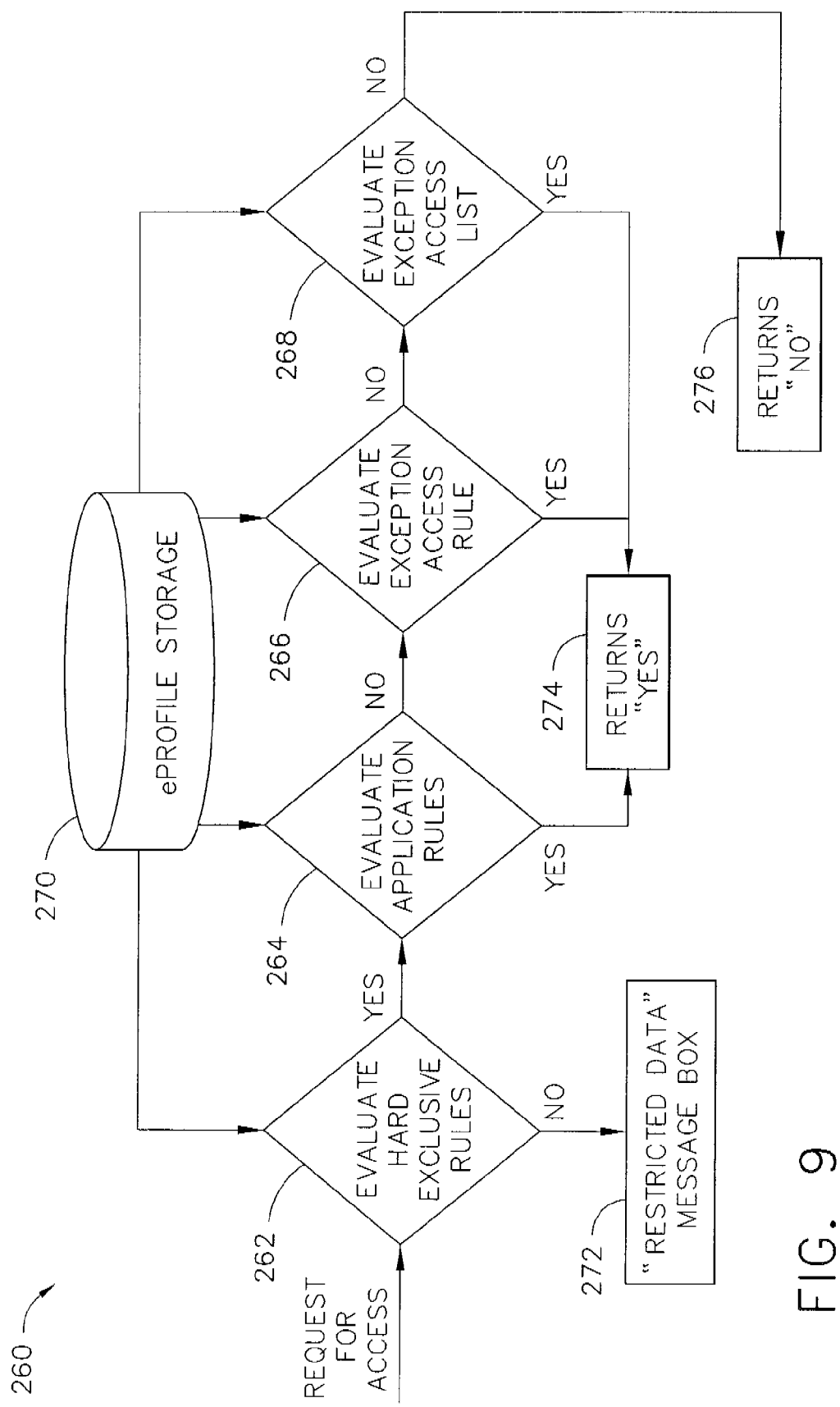
FIG. 9 is an exemplary embodiment of a flow chart describing the Evaluation Process.

FIG. 9 is an exemplary embodiment of a flow chart describing Evaluation Process 260. Evaluation Process 260 relates to the system's decision-making process in permitting a user access to data or applications. After a user requests access, after logging onto UPMS 10, the system determines whether the user is permitted access after completing an evaluation based on Hard Exclusive Rules 262, Application Rules 264, Exception Access Rules 266, and Exception Access List 268. During the evaluation process, the system retrieves the information from eProfile Storage 270 and submits any new information to eProfile Storage 270, as required. If the user is approved based on an evaluation of Application Rules 264, Exception Access Rules 266, and Exception Access List 268, the user is permitted access 274. If access is denied, a message informing such restriction is conveyed to the user through a Message Box 272, and the user is notified 276.

Figure 10:
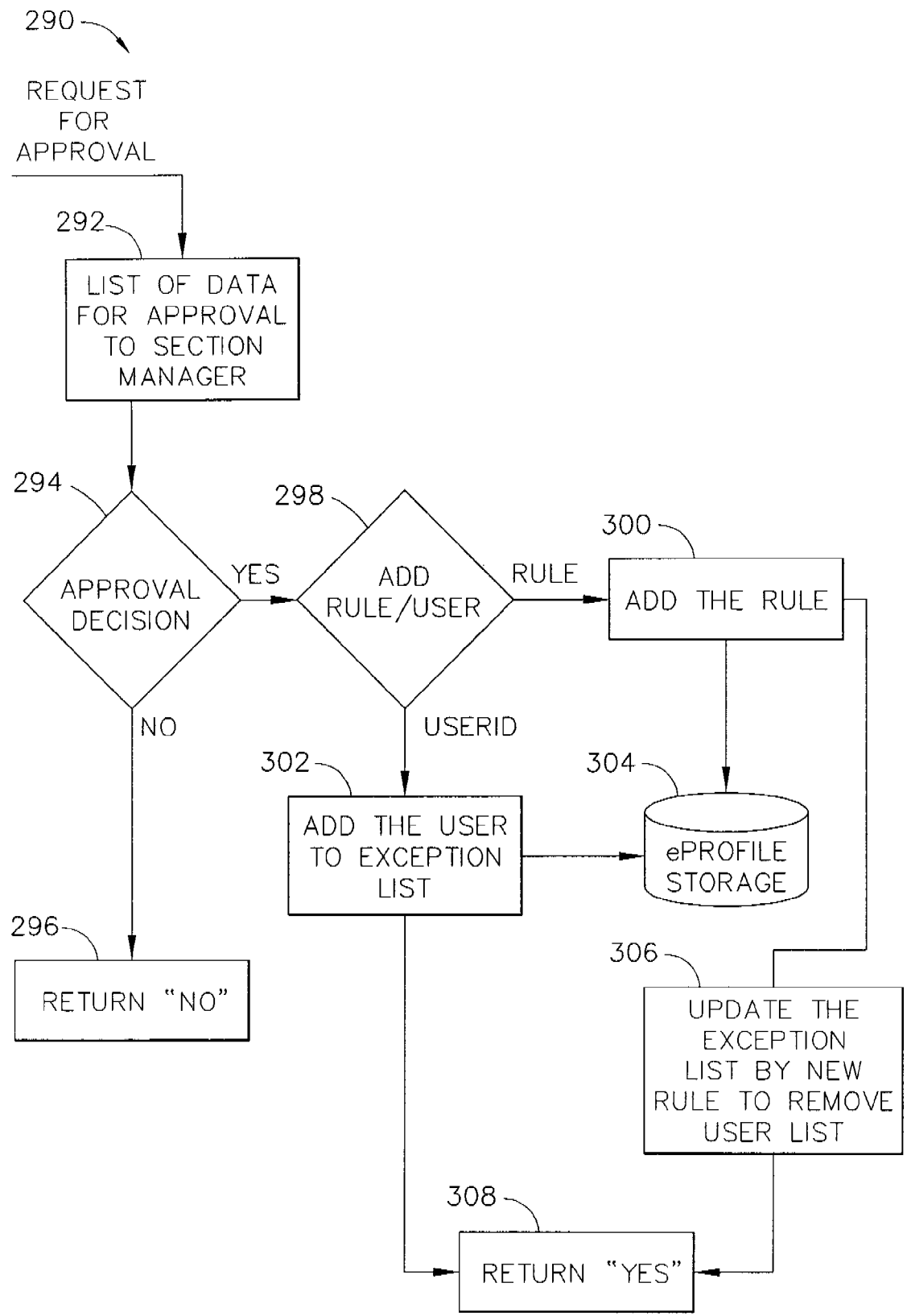
FIG. 10 is an exemplary embodiment of a flow chart describing the Exception Access Process.

FIG. 10 is an exemplary embodiment of a flow chart describing Exception Access Process 290. Exception Access Process 290 relates to the system's Maintenance Process. Process 290 includes a request being submitted by the user for approval. The request includes a list of data for approval to section manager 292. Section Manager is responsible for decision 294 to approve or disapprove. If the request is denied, a notification 296 is sent to the requester. If the request is approved, a decision 298 is made either to add the rule 300 or to add the user 302. When a new rule or a new user is added, eProfile Storage 304 database is automatically updated. If the rule is added 300, an exception list is updated 306, and an affirmative notification 308 is sent to the user.

Figure 11:
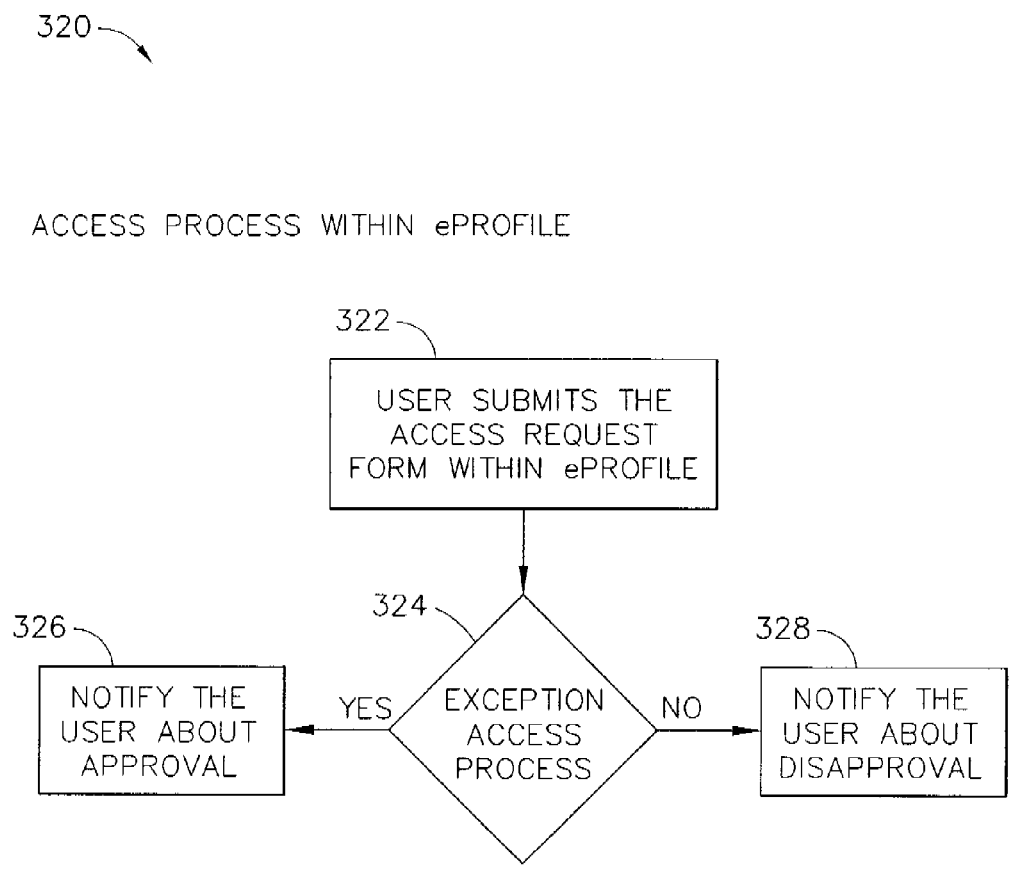
FIG. 11 is an exemplary embodiment of a flow chart describing the Access Process within the eProfile.

FIG. 11 is an exemplary embodiment of a flow chart describing Access Process within eProfile 320. Access Process within eProfile 320 relates to the system's Maintenance Process. Process 320 includes a request form 322 that is submitted by the user to request access. The form is subjected to Exception Access Decision Making Process 324, and after the user's access request is approved 326 or denied 328, the user is notified accordingly.

In one embodiment, client system 14, as well as server system 12, are protected from access by unauthorized individuals. As described, UPMS 10 includes an interactive searchable database 20 for storing users related information. eProfile database is a subset of database 20. Through UPMS 10, managers, employees, contractors, variable workers and database administrators directly update, review and generate reports of current information based on their individual authentication criteria.

While the invention has been described in terms of various specific embodiments, those skilled in the art will recognize that the invention can be practiced with modification within the spirit and scope of the claims.

What is claimed is:

1. A method of managing user profiles for controlling access to a web-based system that includes a server system coupled to a centralized database and at least one client system, said method comprising the steps of:

creating an electronic profile for a user from the at least one client system within the centralized database;

creating data profiles within the centralized database for applications of the server system, wherein creating the data profile comprises establishing rules and access methods;

determining whether to grant the user access to an application of the server system after completing an evaluation based on the created user electronic profile, established rules and access methods in response to a request from the user for access to the application;

if the user is denied access to the application, notifying the user of the denial to access the application;

if the user is granted access to the application, determining whether to grant the user access to a set of specific data within the application after completing another evaluation based on the created user electronic profiles, established rules and access methods in response to another request from the user for access to the set of specific data;

if the user is denied access to the set of specific data:
   prompting the user to complete a request for quick approval wherein the request for quick approval includes a list of data for approval;
   automatically determining, using an internal exception access process, an approval or a disapproval of quick access based on pre-established criteria and the list of data for approval;
   if the request for quick approval is approved, determining either to add a rule or to add the user to the centralized database;
      if the rule is added, updating an exception list;
      if the user is added, updating the centralized database;
      notifying the user of the approval of the request for quick approval; and
      continuing with the application and accessing the set of specific data;
   if the request for quick approval is denied, notifying the user of the denial of the request for quick approval;

if the user is granted access to the set of specific data, continuing with the application and accessing the set of specific data.

2. A method according to claim 1 wherein said step of creating an electronic profile for a user further comprises the step of creating an electronic profile based on information available from at least one an Oracle Human Resource Application and a Request for Computer Access Application.

3. A method according to claim 1 wherein the created data profiles is based on at least one of Data Elements, Data Tags, Rules of Access, an Approver's Name for Each Rule of Access, Rules of Exclusion, an Exception List, and Field Tags.

4. A method according to claim 3 wherein said step of establishing rules and access methods further comprises the steps of:

establishing rules based on at least one of Rule Based Access guidelines, Group Based Access guidelines, Search & Subscribe Utilities guidelines, Active Positioning monitoring guidelines, Hard Exclusion Rules guidelines, and Access Audits guidelines; and establishing access methods to ensure timely and accurate decision making based on criteria established by system administrators.

* * * * *

UNITED STATES PATENT AND TRADEMARK OFFICE
CERTIFICATE OF CORRECTION

| | |
|---|---|
| PATENT NO. | : 7,231,378 B2 |
| APPLICATION NO. | : 09/842577 |
| DATED | : June 12, 2007 |
| INVENTOR(S) | : Lawson et al. |

It is certified that error appears in the above-identified patent and that said Letters Patent is hereby corrected as shown below:

In Claim 1, column 8, line 5, delete "afier completing" and insert therefor -- after completing --.

Signed and Sealed this

Twentieth Day of November, 2007

JON W. DUDAS
*Director of the United States Patent and Trademark Office*